US007180218B2

(12) United States Patent
Christian et al.

(10) Patent No.: US 7,180,218 B2
(45) Date of Patent: Feb. 20, 2007

(54) COMPRESSION JOURNAL

(75) Inventors: Paul S. Christian, Dunstable, MA (US); Chad S. Klotzle, Acton, MA (US)

(73) Assignee: Diamond Antenna & Microwave Corp., Littleton, MA (US)

(*) Notice: Subject to any disclaimer, the term of this patent is extended or adjusted under 35 U.S.C. 154(b) by 0 days.

(21) Appl. No.: 09/776,318

(22) Filed: Feb. 2, 2001

(65) Prior Publication Data

US 2001/0045877 A1 Nov. 29, 2001

Related U.S. Application Data

(60) Provisional application No. 60/181,590, filed on Feb. 10, 2000.

(51) Int. Cl.
*H02K 13/00* (2006.01)

(52) U.S. Cl. .................................................... 310/219

(58) Field of Classification Search ................ 310/219, 310/249, 251, 45

See application file for complete search history.

(56) References Cited

U.S. PATENT DOCUMENTS 2,671,885 A * 3/1954 Bouix ........................ 333/256
3,914,715 A * 10/1975 Hubing et al. ............ 333/24 R
4,146,807 A * 3/1979 Hatch ......................... 310/219
4,153,868 A * 5/1979 Janotik ........................ 322/48
4,233,580 A * 11/1980 Treczka et al. ............. 333/261
4,241,271 A * 12/1980 Johnson et al. ............. 310/219
4,296,345 A * 10/1981 Haberl ........................ 310/219
4,320,318 A * 3/1982 Weldon ....................... 310/219
4,347,456 A * 8/1982 Chabrerie ................... 310/248

* cited by examiner

*Primary Examiner*—Thanh Lam
(74) *Attorney, Agent, or Firm*—Hayes Soloway PC

(57) ABSTRACT

A compression journal for transfer of microwave signals across a rotating interface of a rotary joint comprises a silver impregnated graphite split ring stator which surrounds and is in contact with a coin silver sleeve of a shaft rotor when a rotor assembly is positioned within a stator assembly. At least one O-ring is placed over the outside of the split ring stator to allow slight compression of the silver/graphite split ring stator to maintain continuous electrical contact between the stator and the rotor. A beryllium-copper radial shield is secured to the end of the compression journal securing it within a cavity of the stator assembly. The compression journal floats within the stator assembly to allow rotor/stator concentricities to adjust and seat properly for long term performance.

19 Claims, 9 Drawing Sheets

COMPRESSION JOURNAL

This is a nonprovisional patent application claiming priority of provisional patent application Ser. No. 60/181,590 filed Feb. 10, 2000.

BACKGROUND OF THE INVENTION

1. Field of the Invention

This invention relates to microwave rotary joints, and in particular to a contacting compression journal for improving performance at the electrical interface of a rotor and a stator.

2. Description of Related Art

Rotary joints have a long history of applications for the transfer of microwave signals across a rotating interface. To accomplish the transfer of microwave energy across the rotor and stator of a rotary joint, traditional approaches are to use either a contacting or noncontacting interface. In either case, efficient electrical transfer is necessary to minimize signal loss and also to maximize isolation in multiple channel rotary joints.

Noncontacting rotating interfaces employ overlapping longitudinal sections, known as chokes, sized to an axial dimension that is ideal for a particular frequency. Chokes are sized to correspond to the quarter wavelength of a particular frequency and thereby achieve containment of the signal without physical contact at the rotating junction. The advantage of a noncontacting interface is that all physical wear is eliminated. Disadvantages of this approach are size and weight, particularly at lower frequencies, which have longer wavelengths and therefore require longer chokes.

Contacting rotating interfaces traditionally use journals at the electrical junction. Such journals provide a contact of conductive materials at the rotor/stator interface in order to form an electrical short and minimize signal loss. The advantage of a contacting journal is that size can be greatly reduced when compared to a ¼ wavelength choke interface. Disadvantages of the contacting journal are increased torque, the need for a tight and perfectly concentric fit of the rotating interface, and the fact that contact stress in rotation causes wear and ultimate electrical failure at the rotating interface.

Microwave energy in a rotary joint propagates along a cylindrically shaped conductive path. In order to continue a cylindrical path at the rotating interface the contact fit of a journal is driven radially to form a tight contacting transition, which is necessary for efficient transfer of the energy. Traditional journals consist of overlapping cylinders or sleeves sized such that the outer diameter of the inner sleeve contacts the inner diameter of the outer sleeve along a certain axial distance. Electrical performance of a journal is reliant on precise alignment of the interface and subsequent retention of the alignment as the rotary joint wears through use. Precise alignment of the journal interface is difficult and has limited the use of contacting rotary joints, despite significant advantages of size and weight.

SUMMARY OF THE INVENTION

It is therefore an object of this invention to provide a compression journal for maintaining a continuous electrical contact between a segmented stator ring and a rotor of a rotary joint.

It is another object of this invention to provide a rotary joint journal having increased operational life.

It is yet another object of this invention to provide a rotary joint journal that generates low torque.

It is an object of the present invention to provide lower manufacturing costs for a rotary joint having a compression journal.

It is an object of the invention to provide a compression O-ring around sectional pieces of a cylindrical contact journal to enable easy assembly and a long period of alignment under rotation in a rotary joint.

These and other objects are further accomplished by a compression journal comprising at least two circularly shaped segments, a cylindrical shaft having the circularly shaped segments positioned around the shaft, and means, positioned around the outside of the segments, for maintaining electrical contact between the segments and the cylindrical shaft. The segments comprise a silver impregnated graphite material. The cylindrical shaft comprises a coin silver sleeve around an outer portion of the shaft for contacting the circularly shaped segments. The journal comprises a shield for securing the journal within a stator assembly and blocking RF signal leakage. The means for maintaining electrical contact between the segments and the cylindrical shaft comprises a rubber O-ring. The means for maintaining electrical contact between the segments and the cylindrical shaft comprises a conductive O-ring. The compression journal is positioned within a rotary joint.

The objects are further accomplished by a rotary joint comprising a rotor assembly having a housing and a shaft extending outward from a center portion thereof, a stator assembly having a cylindrical opening for receiving the shaft of the rotor assembly, the housing of the rotor assembly being secured within a housing of the stator assembly, a cavity in the stator assembly for receiving at least two circularly shaped segments positioned around the shaft of the rotor assembly, and means positioned around the outside of the segments for maintaining electrical contact between the segments and the shaft of the rotor assembly. The rotary joint comprises a shield, having an opening for the shaft to pass therethrough, positioned against an end of the circularly shaped segments for securing the segments within the cavity of the stator. The shield provides a ground connection between the circularly shaped segments and the stator housing. The segments comprise a silver impregnated graphite material. The cylindrical shaft comprises a coin silver outer sleeve for contacting the segments. The means for maintaining electrical contact between the segments and the shaft comprises a rubber O-ring. The means for maintaining electrical contact between the segments and the shaft may also comprise a conductive O-ring. The cavity of the stator assembly comprises a channel having a predetermined width within the cavity for receiving the means for maintaining electrical contact between the segments and the shaft. The housing of the rotor assembly comprises a bearing ring positioned around an outer end portion of the housing to facilitate rotation of the rotor assembly when positioned within the stator assembly. The rotor assembly comprises a first capacitive feed ring through which the shaft extends and the stator assembly comprises a second capacitive feed ring through which the shaft passes, the first capacitive feed ring being positioned in close relationship to the second capacitive feed ring when the rotor assembly is positioned within the stator assembly.

The objects are further accomplished by a method of providing a compression journal comprising the steps of providing at least two circularly shaped segments, positioning the circularly shaped segments around a cylindrical shaft, and providing means around the outside of the circularly shaped segments for maintaining electrical contact between the segments and the cylindrical shaft. The step of providing at least two circularly shaped segments comprises the step of providing silver impregnated graphite segments. The step of positioning the circularly shaped segments around a cylindrical shaft comprises the step of providing a coin silver sleeve around an outer portion of the shaft for contact with the circular shaped segments. The step of providing means for maintaining electrical contact between the segments and the cylindrical shaft comprises the step of providing a rubber O-ring. Also, the step of providing means for maintaining electrical contact between the segments and the cylindrical shaft comprises the step of providing a conductive O-ring. The method comprises the step of attaching a metal shield over an end of the circularly shaped segments for blocking RF signal leakage.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
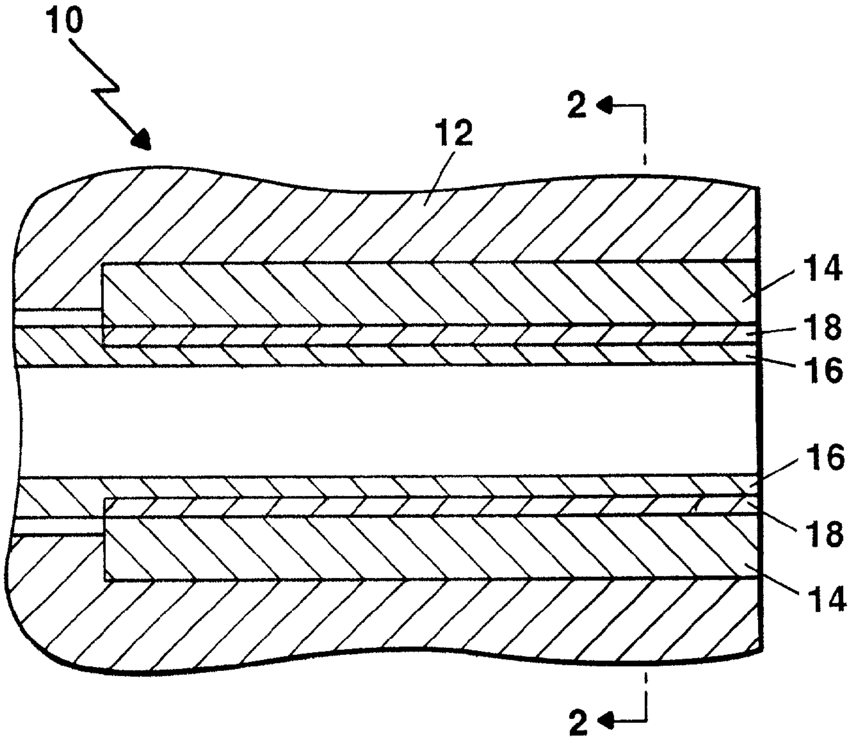
Figure 1 (PRIOR ART)
FIG. 1. is a cross-sectional view of a prior art contacting journal for a rotary joint.
Figure 2:
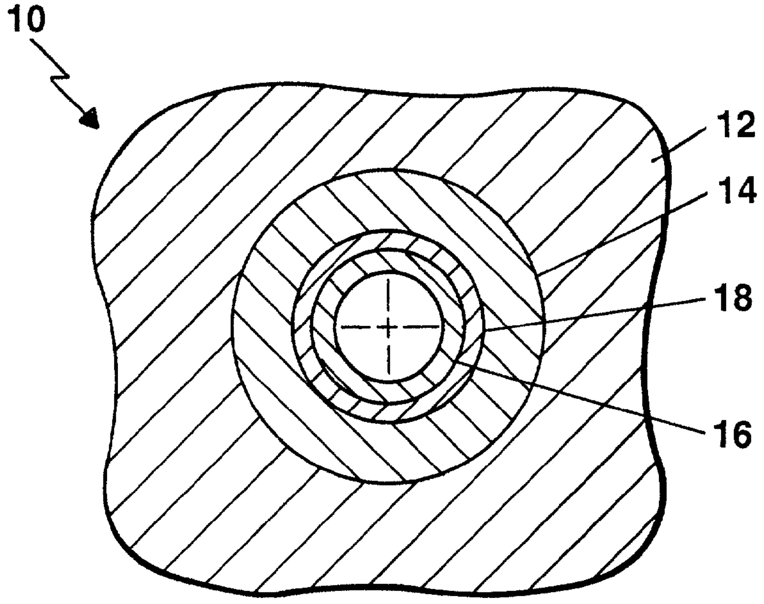
Figure 2 (PRIOR ART)
FIG. 2 is a cross-sectional view of the contacting journal of FIG. 1 taken along lines 2—2.

Referring to FIG. 1 and FIG. 2, FIG. 1 is a cross-sectional view of a prior art contacting journal 10 for a rotor joint positioned within a metallic housing or stator assembly 12. FIG. 2 is a cross-sectional view of the contacting journal of FIG. 1 along lines 2—2. The contacting journal 10 comprises a cylindrical silver impregnated graphite sleeve or stator 14. A metallic shaft or rotor 16 is inserted within the hollow stator 14 and the outer circumference of the shaft 16 comprises a coin silver sleeve 18 which contacts the silver impregnated graphite sleeve of the stator 14. The contacting journal fits within a cavity of the stator assembly 12 which may comprise aluminum, brass or stainless steel. The contacting journal 10 provides for contact of conductive materials at the rotor 16 and stator 14 interface in order to form an electrical short and minimize signal loss; however, this results in increased torque, a need for a tight and perfectly concentric fit of the rotating interface, and contact stress during rotation which causes wear and ultimate electrical failure at the rotating interface.

Figure 3:
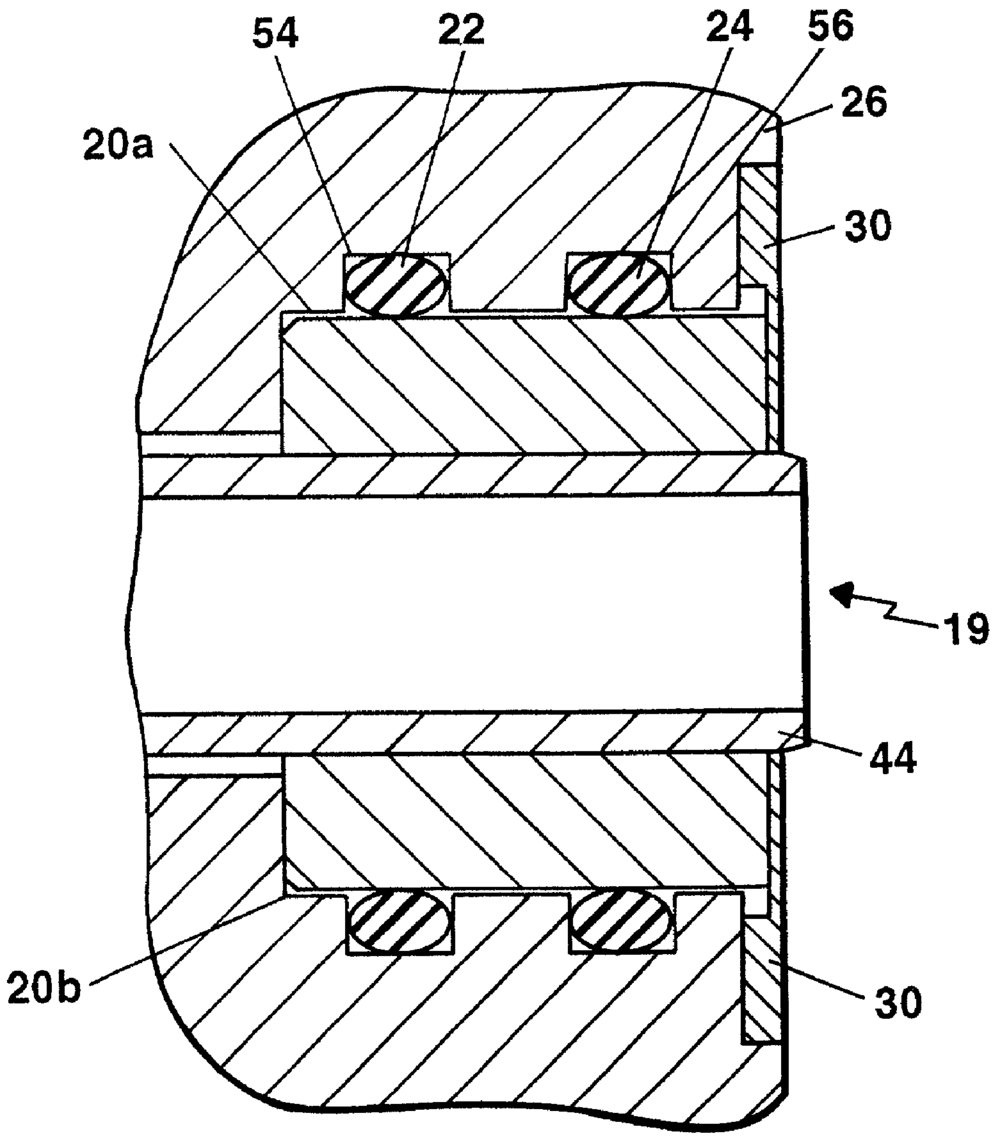
FIG. 3 is a cross-sectional view of the invention showing split rings of a stator surrounding a shaft of a rotor, and two spaced apart O-rings positioned around the split rings.
Figure 4:
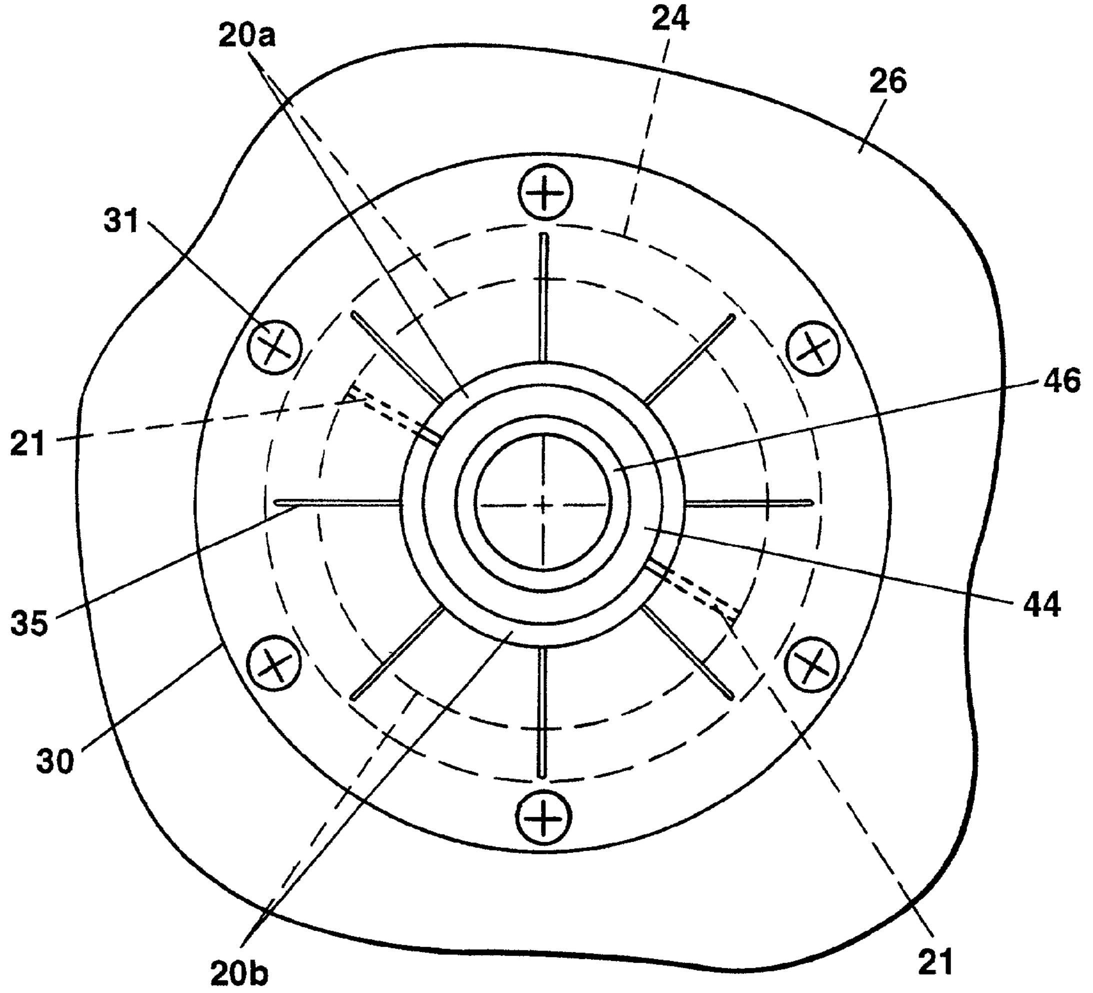
FIG. 4 is an end view of the compression journal showing a radial shield attached to the stator housing.

Referring now to FIG. 3 and FIG. 4, FIG. 3 is a cross-sectional view of the invention showing a contacting compression journal 19 positioned within a metallic housing or stator housing 26. FIG. 4 is an end view of the compression journal 19 showing a radial shield 30 covering the end of the compression journal and attached to the stator housing 26. The compression journal 19 is used in microwave and high frequency rotary joints that require a contacting interface.

The compression journal 19 comprises two semi-circular spaced ring segments 20*a*, 20*b* which are made from silver impregnated graphite. Each ring segment is placed around a coin silver sleeve 44 portion of shaft 46 which extends from a rotor assembly 25 such that there is a small air gap 21 at each ring segment intersection as shown in FIG. 4. The air gap 21 is on the order of 0.003 inches to 0.008 inches. This insures a complete interference fit over the coin silver sleeve 44, and prevents the ring segments 20*a*, 20*b* from closing up too much assuring easy, blind assembly. The outer diameter of the ring formed by the two ring segments 20*a*, 20*b* is dependent on space available in the rotor assembly 25, but should be thick enough for mechanical integrity of the segments 20*a*, 20*b*.

When the segments 20*a*, 20*b* are placed over the coin silver sleeve 44, O-ring 24 is placed over the outside of the ring segments 20*a*, 20*b* to provide a slight compression of the silver impregnated graphite ring segments 20*a*, 20*b* onto the coin silver sleeve 44. The O-ring 24 is embodied by diametrical compressive material. More than one O-ring may be placed around the ring segments 20*a*, 20*b*, such as O-rings 22, 24 in the embodiment shown in FIG. 3, depending on the length of the ring segments 20*a*, 20*b* for a particular rotary joint design. When the compression journal 19 is positioned within a cavity 45 of the stator housing 26, the cavity 45 comprises one or more channels 54, 56 for receiving each O-ring 22, 24, respectively. The width of each channel 54, 56 along with the characteristics of the O-ring determines the slight compression of ring segments 20*a*, 20*b* that is exerted on the coin silver sleeve 44. For example, in the embodiment shown in FIG. 3 the width of the channel is approximately 0.080 inches and the depth of the channel is approximately 0.050 inches. The O-rings 22, 24 are made of rubber and may be embodied by Part No. 2-015 manufactured by Apple Rubber Products, Inc. of Lancaster, N.Y. Different sizes of O-rings 22, 24 may be used depending on the size of the journal. Different rubber materials may also be used along with different channel depths depending on temperature extremes and desired torque. The O-rings may also be made of conductive material such as an EMI material available from Chomerics, Division of Parker Hannifin of Woburn, Mass.

Referring to FIG. 3, the silver-graphite split ring segments 20*a*, 20*b*, being compressed by one or more O-rings 22, 24 onto a diametrically aligned coined silver sleeve 44, can be implemented in the other ways. For example, the beryllium-copper ring can be replaced by conductive O-rings instead of using rubber O-rings. The number of O-rings used depends on the size of the journal and the amount of compression required. Multiple O-rings ensure even compression along the length of the journal as well. The length of the journal may also vary depending on the amount of isolation required.

Referring to FIG. 4, the beryllium-copper radial shield 30 is placed over the end of split ring segments 20*a*, 20*b* and secured to the stator housing 26 by screw fasteners 31. The radial shield 30 comprises a plurality of equally spaced-apart radial slots 35 which allow the ring to flex when holding the journal 19 in place. The applied axial compression on the journal 19 assures positive electrical contact with the journal, but can also be adjusted by bending the slotted fingers so that the axial compression does not overcome the radial compression induced by the O-rings 22, 24.

The radial shield 30 inhibits RF energy leakage from passing through this area. The radial shield 30 is placed in a non-rotational interface and it is not critical for the dynamic RF seal. Also, as discussed above, conductive O-rings may be used as an RF shield in place of the beryllium shield 30. The choice of which type of shield to use is primarily based on cost and availability of the parts. Material other than beryllium-copper may be used as long as the material exhibits similar properties. The air gap 21 is shown at the ring segment intersections. Also, shown in FIG. 4 is the cylindrical shaft 46 having a coin silver sleeve 44 surrounding the outer portion of the shaft 46 and the O-ring 24 around the circumference of the ring segments 20*a*, 20*b*.

The compression journal 19 improves electrical parameters in a rotary joint 50 such as improved isolation between microwave channels of a multi-channel rotary joint, reduced noise within the device, improved electrical contact in the axial direction, whereas a traditional journal bearing may contact anywhere along the axial length during rotation, causing changes in electrical performance, provides a more uniform, concentric and axial contact, reduced insertion loss within the device, and resists rotational effects on electrical performance. Also, because the contact is purely resistive with a very low resistance, the compression journal 19 is frequency insensitive.

The compression journal 19 also has mechanical benefits over a traditional journal bearing arrangement such as requiring a much shorter bearing length to provide a better electrical contact; shorter length allows the rotational torque to be lower than a traditional journal; allows a higher non-concentricity on rotor/stator housings while maintaining integrity and performance; longer lasting with virtually no wear once the joint is properly assembled and run-in; provides a complete circumferential contact; provides more predictable torque with greater consistency between units; and provides greater reliability over temperature.

Figure 5:
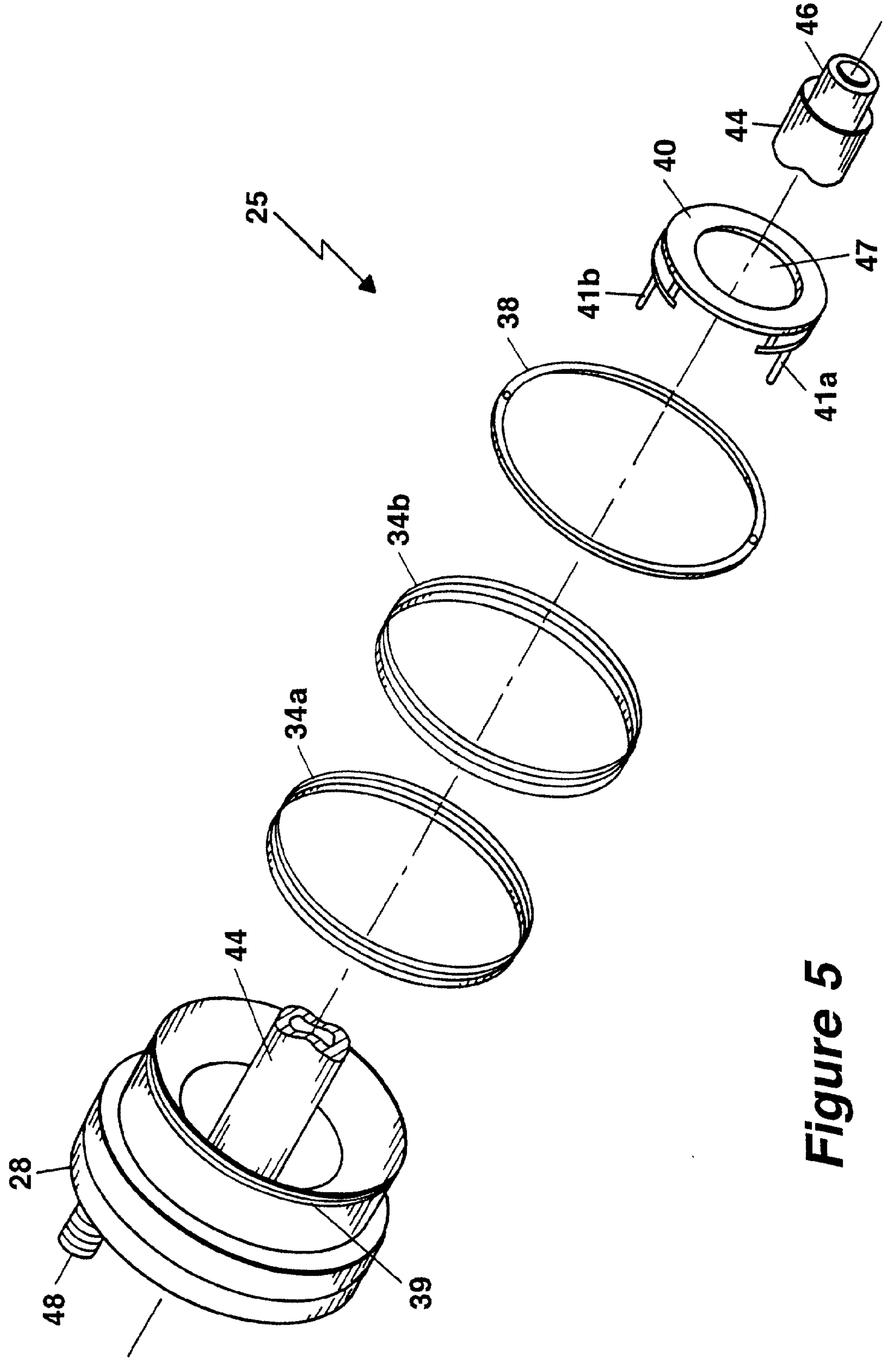
FIG. 5 is an exploded perspective view of the rotor assembly of the rotary joint employing the invention.

Referring now to FIG. 5, an exploded perspective view of the rotor assembly 25 of the rotary joint 50 is shown. The rotor assembly 25 comprises the rotor housing 28, the shaft 46 having an outer sleeve 44 and extending from the housing 28, a pair of bearings 34*a*, 34*b* and a bearing ring 38 which screws onto the threads 30 on the end edge of the rotor housing 28 for securing the bearings 34*a*, 34*b* on the outside of the rotor housing 28. A capacitive feed ring 4 comprises two terminals 41*a*, 41*b* and has a center hole 47 for the shaft 46 to extend therethrough. The terminals 41*a*, 41*b* fit into holes within the housing for connection to a stripline power divider 37 mounted within the rotor housing 28 (FIG. 4). The rotor housing 28 may be made with aluminum, brass or stainless steel.

Figure 6:
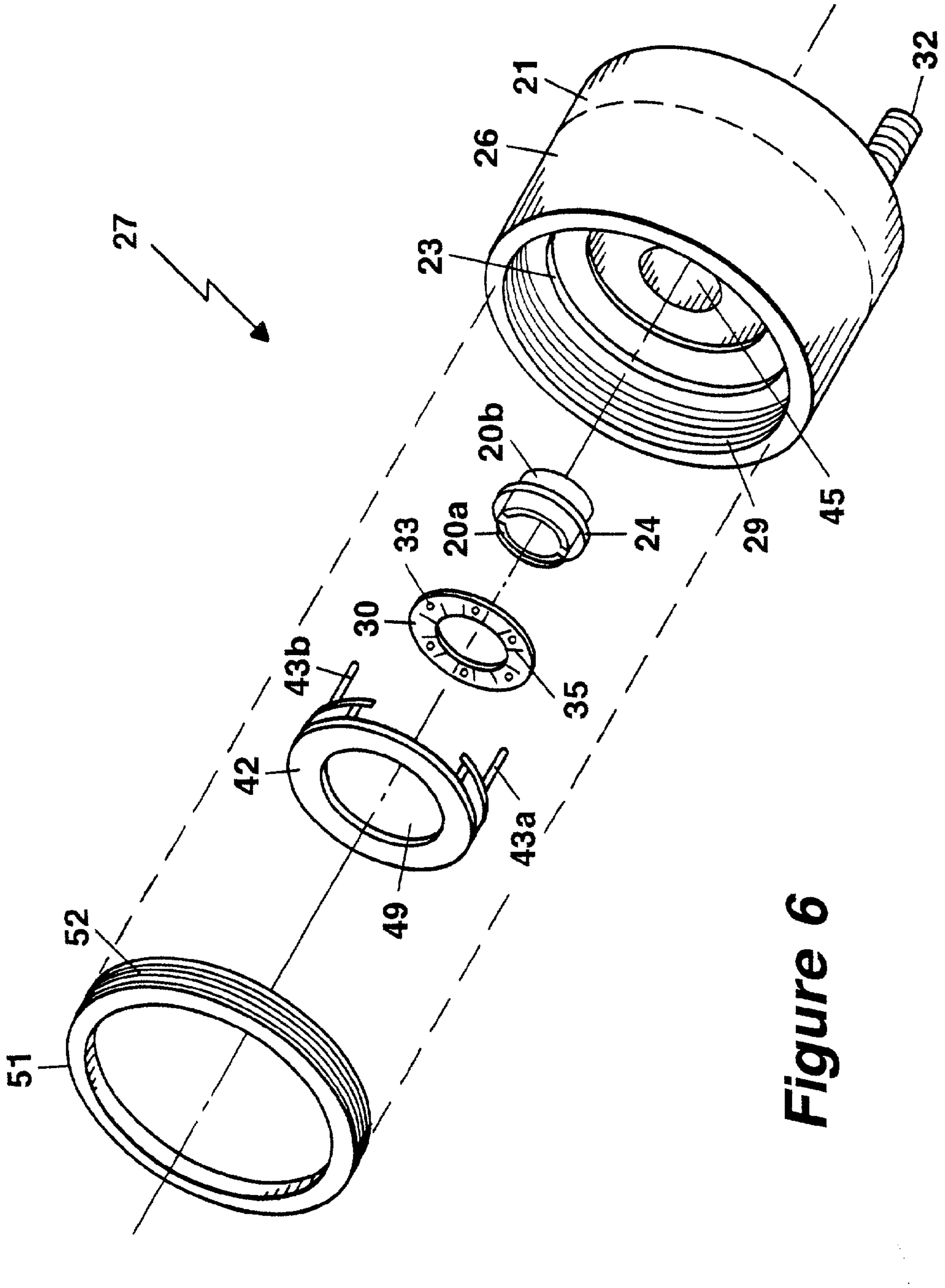
FIG. 6 is an exploded perspective view of the stator assembly of the rotary joint employing the invention.

Referring to FIG. 6, an exploded perspective view of the stator assembly 26 of the rotary joint 50 is shown. The two semi-circular ring segments 20*a*, 20*b* having an O-ring 24 positioned around the outside surfaces of the ring segments 20*a*, 20*b* are inserted within the cavity 45. The cavity 45 comprises a channel for receiving the O-ring 24 and if there is more than one O-ring, then the cavity will have another channel for the additional O-ring. The radial shield 36 is secured to a base wall of the stator housing 26 covering the end of the split rings 20*a*, 20*b* by screw fasteners 31. Another capacitive feed ring 42 is provided which comprises two terminals 43*a*, 43*b* and has a center hole 49 for the rotor shaft 46 to extend therethrough and into the cavity 45. The terminals 43*a*, 43*b* fit into holes within the housing for connection to a stripline power divider mounted within an end portion 21 of the stator housing 26. A ring 51 screws into the screw threads 29 on the inside of the stator housing 26 and secures the rotor assembly 25 within the stator assembly 27. The stator housing 26 may be made with aluminum, brass or stainless steel.

Figure 7:
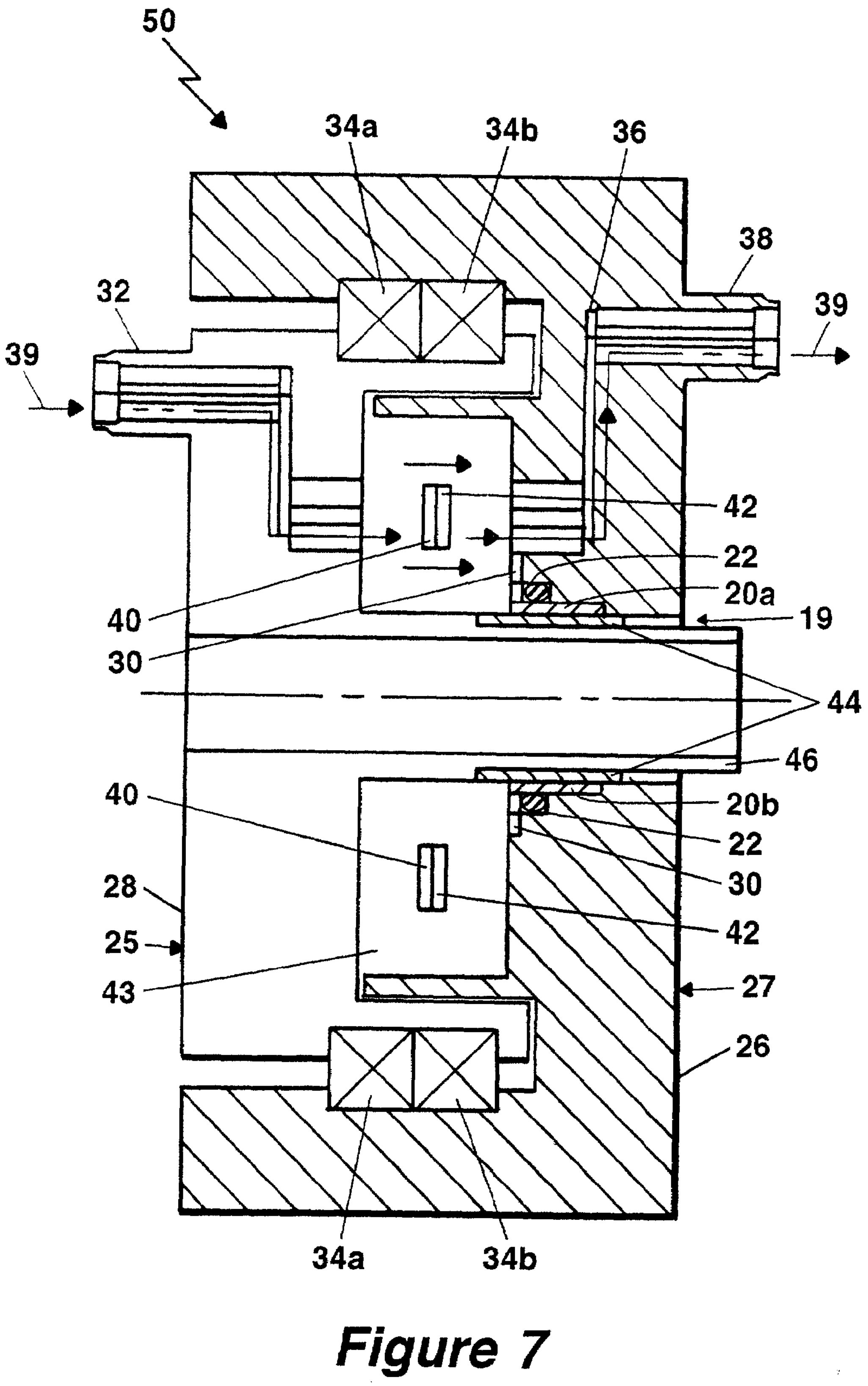
FIG. 7 is a side view cutaway of the rotary joint showing the rotor assembly inserted within the stator assembly.

Referring to FIG. 7, a side view cutaway of the rotary joint 50 shows the rotor assembly 25 inserted within the stator assembly 27 and the shaft 46 of rotor assembly 25 inserted within the cavity 45 of the compression journal 19 and extending through the stator assembly 27. The split ring segments 20*a*, 20*b* surround the coin silver sleeve 44 of the shaft 46 and the O-ring 22 is position around the ring segments 20*a*, 20*b*. The path of RF signal flow is indicated by the arrows 39. The capacitive feed ring 40 of the rotor assembly 25 is disposed adjacent to the capacitive feed ring 42 of the stator assembly 27 when the rotary joint 50 is assembled.

Figure 10:
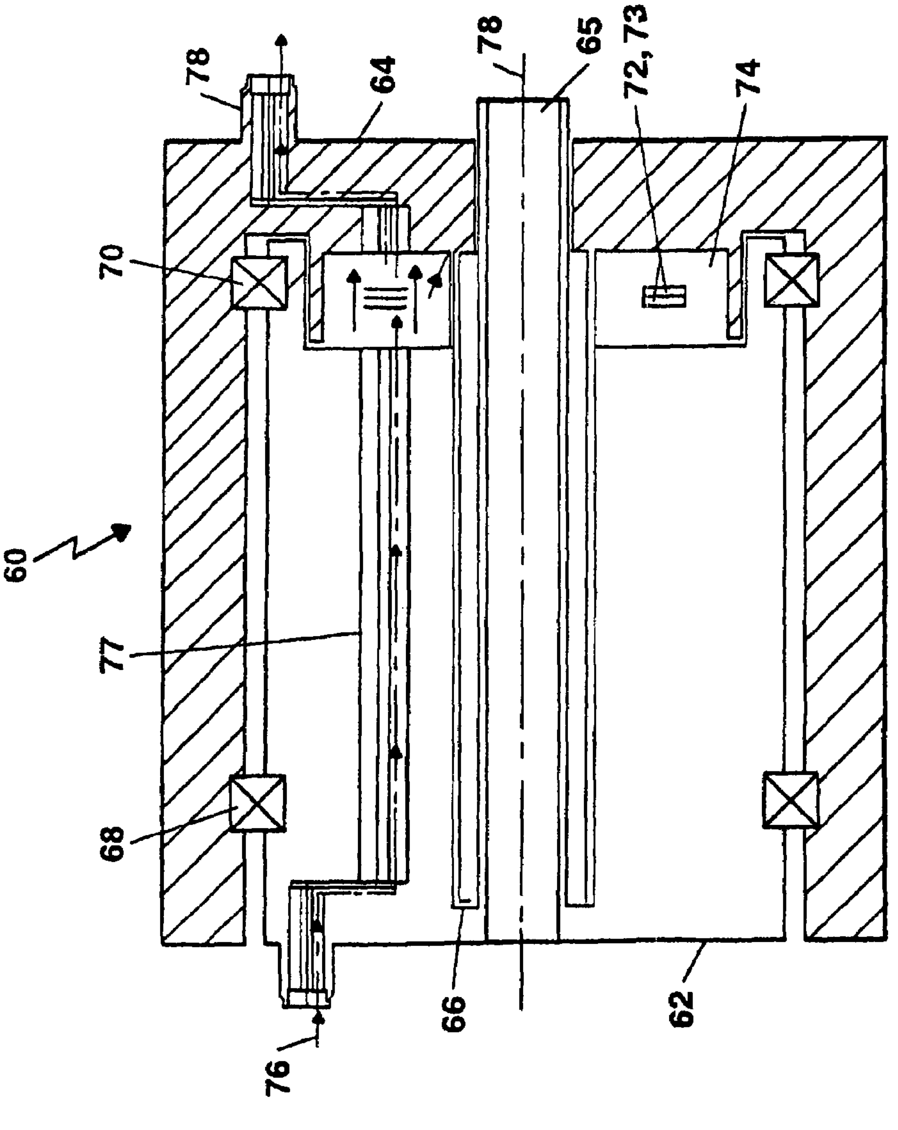
Figure 10 PRIOR ART
FIG. 10 is a cross-sectional view of a rotary joint having a noncontacting rotation interface comprising a quarter wavelength choke.

One of the major advantages of the compression journal is the decreased amount of space required to achieve a good electrical and mechanical contact. This advantage is especially evident at lower microwave frequencies. Rotary joints are primarily used to cover frequencies from 1 to 40 Ghz (although rotary joints are made that go lower and higher). At lower frequencies such as 1 Ghz, the ¼ wavelength can be quite long, such as 2.95 inches. FIG. 10 shows a prior art non-contacting ¼ wavelength choke. Using the compression journal 19, length was decreased substantially from the prior art journal. Also, the compression journal 19 results in a more balanced design as well as the benefits listed above.

Figure 8:
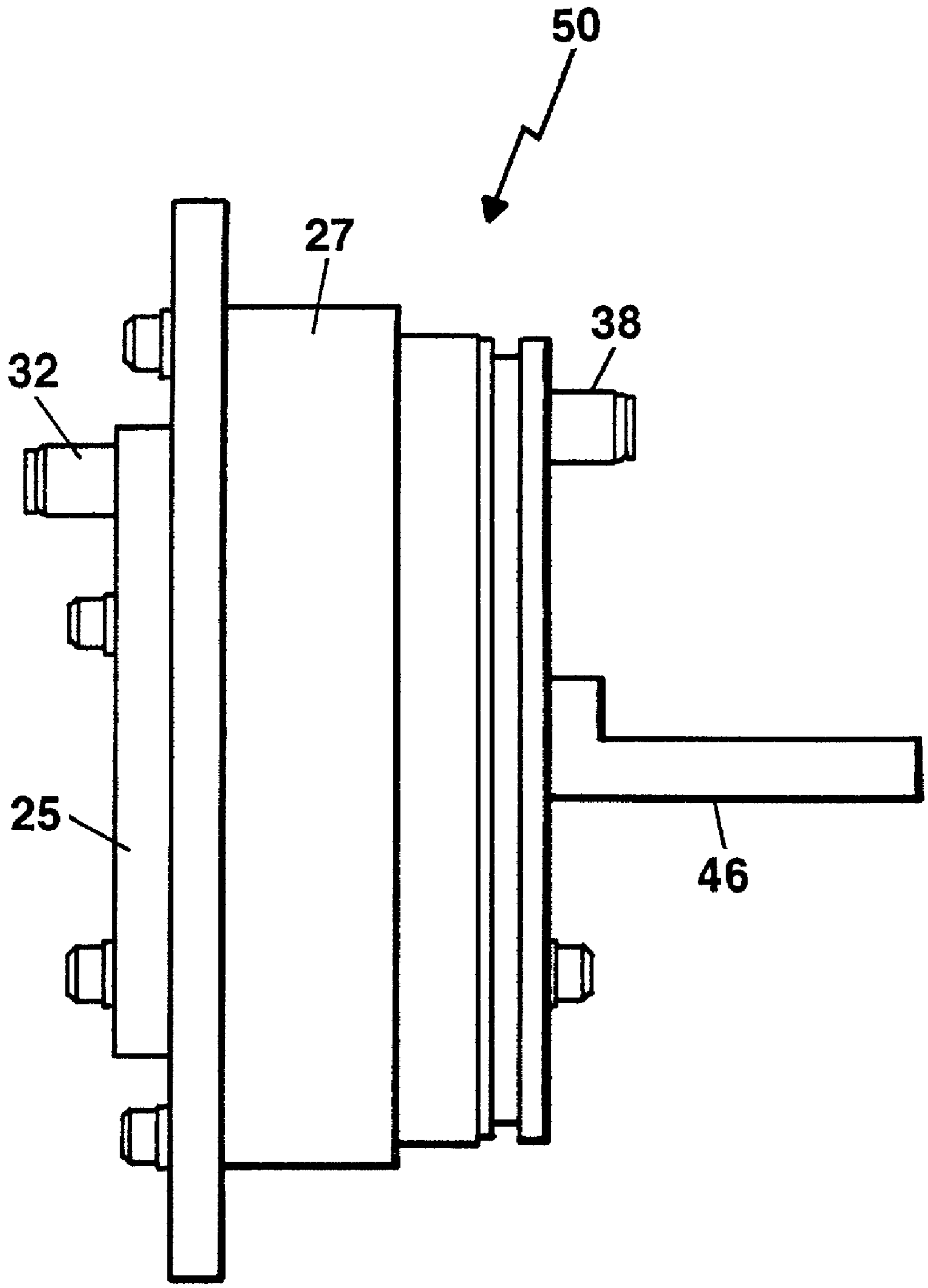
FIG. 8 is a side elevational view of the single channel, hollow shaft rotary joint comprising the compression journal.

Referring to FIG. 8, a side elevational view of the single channel, hollow shaft rotary joint 50 is shown comprising the rotary assembly 25 mounted within the stator assembly 27, and showing connectors 32 and 38 for receiving and sending microwave signals. Rotor shaft 46 is shown extending from the stator assembly 27, which may be used to turn the rotor of another rotary joint. The compression journal 19 of FIG. 7, which is used within the rotary joint 50, enables the outside dimensions of rotary joint 50 to be approximately 3.0 inches high and 1.5 inches wide. However, one skilled in the art will recognize that the physical dimensions of the rotary joint 50 comprising the compression journal 19 will vary depending on microwave frequencies being used and the specifications for a particular microwave application.

Figure 9:
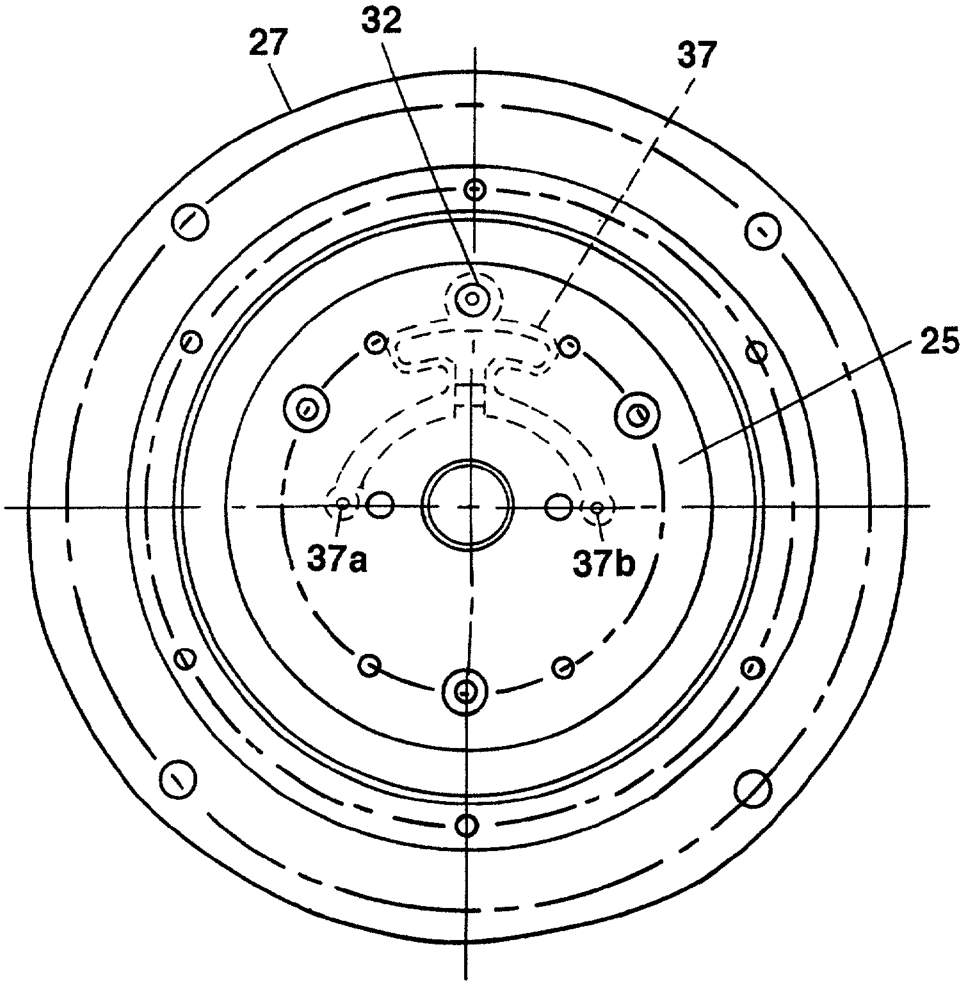
FIG. 9 is an end view of the rotary joint showing a strip line power divider disposed within the rotary assembly.

Referring now to FIG. 9, an end view of the rotary joint 50 of FIG. 8 is shown having an outside diameter of 3 inches. The stripline power divider 37 is shown mounted within the rotor assembly 25 which is connected to connector 32. The ends 37*a*, 37*b* of the power divider 37 make electrical contact with the terminals 41*a*, 41*b* of capacitive feed ring 40 within the rotor assembly 25.

Referring to FIG. 10, a cross-sectional view of a rotary joint 60 is shown having a noncontacting rotational interface comprising a quarter wavelength choke 66. The rotary joint 60 comprises a rotor assembly 62 inserted within a stator assembly 64. The rotor assembly 62 comprises a shaft 65, bearings 68, 70, a capacitive feed ring 72, an RF connector 76 and a coax line 77. The stator assembly 64 comprises an open area for receiving the rotor assembly 62 and a cavity for the shaft 65 to extend through the stator assembly 64. Space between the rotor shaft 65 and an inside wall of the rotor assembly 62 forms the quarter wavelength choke 66. This type of rotary joint 60 has a leakage path 78 because it is impossible for the quarter wavelength choke 66 to provide 100% isolation over any microwave band; it is typically designed for one frequency, and at the midpoint of the desired passband. The prior art contact journal (FIG. 1) and the compression journal 19 (FIG. 3) are frequency independent.

Referring to FIGS. 1, 2, 3 and 10, the compression journal 19 provides increased life, increased reliability and consistency of operation between various units which result from the split ring segments 20*a*, 20*b* being compressed by one or more O-rings 22, 24 (FIG. 3). With the prior art contacting journal of FIGS. 1 and 2, each journal had to fit precisely, requiring rework to get an exact fit. If the rotor and stator are not precisely aligned, a good contact may be difficult to achieve. once the prior art contacting journal has been worn down just a little, such as 0.0005 to 0.001 inches, the contact is lost. The quarter wavelength design of FIG. 10 has its life limited only by the bearings and the seals. The compression journal 19 of FIG. 3 does not need to be fitted as precisely as the prior art contacting journal to achieve a good contact, but it does require a run-in time period for the split journal to align itself and burnish itself in. If there is some slight axial misalignment, the compression journal 19 will adjust by means of the compression in the O-rings. As the silver-graphite alloy ring begins to wear, the compression from the O-rings 22, 24 will continue to pull the split ring segments 20*a*, 20*b* in radially to assure good contact. Reliability and consistency are increased as well due to the decrease in required precision and the predictable compression of the O-rings.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A compression journal comprising:
- at least two semi-circular segments;
- a cylindrical shaft having said semi-circular segments positioned around said shaft;
- at least one air gap positioned circumferentially between two of the semi-circular segments; and
- means, positioned around the outside of said semi-circular segments, for maintaining electrical contact between said semi-circular segments and said cylindrical shaft.

2. The compression journal as recited in claim 1 wherein said semi-circular segments comprise a silver impregnated graphite material.

3. The compression journal as recited in claim 1 wherein said cylindrical shaft comprises a coin silver sleeve around an outer portion of said shaft for contacting said semi-circular segments.

4. The compression journal as recited in claim 1 wherein said journal comprises a shield for securing said journal within a stator assembly and blocking RF signal leakage.

5. The compression journal as recited in claim 1 wherein said means for maintaining electrical contact between said semi-circular segments and said cylindrical shaft comprises a rubber O-ring.

6. The compression journal as recited in claim 1 wherein said means for maintaining electrical contact between said semi-circular segments and said cylindrical shaft comprises a conductive O-ring.

7. The compression journal as recited in claim 1 wherein said compression journal is positioned within a rotary joint.

8. A rotary joint comprising:
- a rotor assembly having a housing and a shaft extending outward from a center portion thereof;
- a stator assembly having a cylindrical opening for receiving said shaft of said rotor assembly, the housing of said rotor assembly being secured within a housing of said stator assembly;
- a cavity in said stator assembly for receiving at least two semi-circular segments positioned around said shaft of said rotor assembly;
- at least one air gap positioned circumferentially between the two semi-circular segments; and
- means positioned around the outside of said semi-circular segments for maintaining electrical contact between said semi-circular segments and said shaft of said rotor assembly.

9. The rotary joint as recited in claim 8 wherein said rotary joint comprises a shield, having an opening for said shaft to pass therethrough, positioned against an end of said semi-circular segments for securing said semi-circular segments within said cavity of said stator.

10. The rotary joint as recited in claim 9 wherein said shield provides a ground connection between said semi-circular segments and said stator housing.

11. The rotary joint as recited in claim 8 wherein said semi-circular segments comprise a silver impregnated graphite material.

12. The rotary joint as recited in claim 8 wherein said cylindrical shaft comprises a coin silver outer sleeve for contacting said semi-circular segments.

13. The rotary joint as recited in claim 8 wherein said means for maintaining electrical contact between said semi-circular segments and said shaft comprises a rubber O-ring.

14. The rotary joint as recited in claim 8 wherein said means for maintaining electrical contact between said semi-circular segments and said shaft comprises a conductive O-ring.

15. The rotary joint as recited in claim 8 wherein said cavity of said stator assembly comprises a channel having a predetermined width within said cavity for receiving said means for maintaining electrical contact between said semi-circular segments and said shaft.

16. The rotary joint as recited in claim 8 wherein said housing of said rotor assembly comprises a bearing ring positioned around an outer end portion of said housing to facilitate rotation of said rotor assembly when positioned within said stator assembly.

17. The rotary joint as recited in claim 8 wherein said rotor assembly comprises a first capacitive feed ring through which said shaft extends and said stator assembly comprises a second capacitive feed ring through which said shaft passes, said first capacitive feed ring being disposed in close relationship to said second capacitive feed ring when said rotor assembly is positioned within said stator assembly.

18. A compression journal comprising:

at least two semi-circular segments;

a cylindrical shaft having said semi-circular segments positioned around said shaft;

a conductive sleeve bonded to the shaft;

at least one air gap positioned circumferentially between two of the semi-circular segments; and means, positioned around the outside of said semi-circular segments, for maintaining electrical contact and physical contact between said semi-circular segments and said conductive sleeve.

19. The compression journal as recited in claim 1 wherein said semi-circular segments are in constant electrical contact with said shaft.

* * * * *